(12) United States Patent
Khan et al.

(10) Patent No.: US 12,348,903 B2
(45) Date of Patent: Jul. 1, 2025

(54) ASSET TRACKING AND NOTIFICATION PROCESSING

(71) Applicant: NCR Atleos Corporation, Atlanta, GA (US)

(72) Inventors: Sudip Rahman Khan, Decatur, GA (US); Matthew Robert Burris, Lawrenceville, GA (US); Christopher John Costello, Suwanee, GA (US); Gregory Joseph Hartl, Atlanta, GA (US)

(73) Assignee: NCR Atleos Corporation, Atlanta, GA (US)

( * ) Notice: Subject to any disclaimer, the term of this patent is extended or adjusted under 35 U.S.C. 154(b) by 24 days.

(21) Appl. No.: 17/690,244

(22) Filed: Mar. 9, 2022

(65) Prior Publication Data

US 2022/0198893 A1    Jun. 23, 2022

Related U.S. Application Data

(63) Continuation of application No. 16/696,706, filed on Nov. 26, 2019, now Pat. No. 11,328,565.

(51) Int. Cl.
*H04N 7/18* (2006.01)
*G06T 7/246* (2017.01)
(Continued)

(52) U.S. Cl.
CPC ............... *H04N 7/18* (2013.01); *G06T 7/246* (2017.01); *G06T 7/50* (2017.01); *G06V 10/22* (2022.01); *G06V 20/52* (2022.01); *G06V 40/10* (2022.01); *G06V 40/103* (2022.01); *G06V 40/107* (2022.01); *G06V 40/20* (2022.01);
(Continued)

(58) Field of Classification Search
None
See application file for complete search history.

(56) References Cited

U.S. PATENT DOCUMENTS 5,263,118 A * 11/1993 Cornelison ............ G06Q 99/00
704/200
7,274,292 B2 * 9/2007 Velhal ................ G08B 21/0227
340/505

(Continued)

FOREIGN PATENT DOCUMENTS

EP          3454267 A1     3/2019

OTHER PUBLICATIONS

"U.S. Appl. No. 16/696,706, Advisory Action mailed Jan. 8, 2021".
(Continued)

*Primary Examiner* — Ricky Chin
(74) *Attorney, Agent, or Firm* — Schwegman Lundberg & Woessner, P.A.

(57) ABSTRACT

An asset is identified in a predefined area. The type of asset is identified through video or wireless tag identification. A security policy associated with the type of asset is obtained. Entries in an asset log are recorded based on a location of the asset, an individual handling the asset, and/or actions taken by an individual with respect to the asset based on the security policy. A real-time notification is sent when the location, the handling, and/or any of the actions warrant a notification based on the security policy.

20 Claims, 4 Drawing Sheets

(51) Int. Cl.

| | |
|---|---|
| *G06T 7/50* | (2017.01) |
| *G06V 10/22* | (2022.01) |
| *G06V 20/52* | (2022.01) |
| *G06V 40/10* | (2022.01) |
| *G06V 40/20* | (2022.01) |
| *G08B 13/12* | (2006.01) |
| *G08B 13/14* | (2006.01) |
| *G08B 13/196* | (2006.01) |
| *H04W 4/029* | (2018.01) |

(52) U.S. Cl.
CPC ....... *G08B 13/126* (2013.01); *G08B 13/1436* (2013.01); *G08B 13/1463* (2013.01); *G08B 13/196* (2013.01); *G08B 13/19608* (2013.01); *G08B 13/19645* (2013.01); *G08B 13/1965* (2013.01); *G08B 13/1966* (2013.01); *G08B 13/19671* (2013.01); *G08B 13/19691* (2013.01); *G08B 13/19693* (2013.01); *G08B 13/19695* (2013.01); *H04W 4/029* (2018.02); *G06T 2207/10016* (2013.01); *G06T 2207/20081* (2013.01); *G06T 2207/30196* (2013.01); *G06T 2207/30232* (2013.01)

(56) References Cited

U.S. PATENT DOCUMENTS

| | | | |
|---|---|---|---|
| 8,570,375 B1* | 10/2013 | Srinivasan | H04N 7/181 |
| | | | 235/383 |
| 8,817,100 B2 | 8/2014 | Nerayoff et al. | |
| 9,124,778 B1* | 9/2015 | Crabtree | G08B 13/19671 |
| 9,230,250 B1* | 1/2016 | Parker | G06Q 30/0185 |
| 9,361,775 B2* | 6/2016 | Pineau | G08B 13/19645 |
| 9,521,291 B2* | 12/2016 | Holub | H04N 1/32154 |
| 9,892,301 B1* | 2/2018 | Holub | G06F 18/2415 |
| 9,892,310 B2 | 2/2018 | Kusens et al. | |
| 10,217,120 B1* | 2/2019 | Shin | G06Q 30/0201 |
| 10,455,353 B2 | 10/2019 | Bestor et al. | |
| 10,497,242 B2 | 12/2019 | Williams | |
| 10,594,987 B1 | 3/2020 | Nixon et al. | |
| 10,853,469 B1* | 12/2020 | McNamara | G06F 3/0488 |
| 10,896,331 B2 | 1/2021 | Man | |
| 10,909,788 B2 | 2/2021 | Burris et al. | |
| 11,328,565 B2* | 5/2022 | Khan | G08B 13/1436 |
| 11,721,041 B2* | 8/2023 | Mirza | G01G 19/4144 |
| 2003/0185358 A1* | 10/2003 | Sakamoto | G10L 15/26 |
| | | | 704/E15.045 |
| 2005/0071883 A1* | 3/2005 | Oh | H04N 7/186 |
| | | | 348/153 |
| 2005/0271251 A1 | 12/2005 | Russell et al. | |
| 2006/0001537 A1 | 1/2006 | Blake et al. | |
| 2006/0004581 A1* | 1/2006 | Claudatos | H04M 3/42221 |
| | | | 704/275 |
| 2006/0077254 A1 | 4/2006 | Shu et al. | |
| 2006/0078047 A1 | 4/2006 | Shu et al. | |
| 2006/0170769 A1 | 8/2006 | Zhou | |
| 2008/0278579 A1* | 11/2008 | Donovan | H04N 7/18 |
| | | | 348/143 |
| 2008/0297599 A1* | 12/2008 | Donovan | G11B 27/329 |
| | | | 348/143 |
| 2009/0066513 A1 | 3/2009 | Kondo et al. | |
| 2009/0089845 A1* | 4/2009 | Akers | G06F 16/70 |
| | | | 725/92 |
| 2009/0115570 A1 | 5/2009 | Cusack, Jr. | |
| 2011/0115634 A1* | 5/2011 | Monden | G06V 20/52 |
| | | | 340/5.32 |
| 2011/0141277 A1 | 6/2011 | Midkiff | |
| 2012/0075475 A1* | 3/2012 | Mariadoss | G06K 7/10009 |
| | | | 348/143 |
| 2012/0154582 A1 | 6/2012 | Johnson et al. | |
| 2012/0257061 A1 | 10/2012 | Edwards et al. | |
| 2013/0091001 A1* | 4/2013 | Jia | G06Q 30/0224 |
| | | | 705/14.25 |
| 2013/0128050 A1 | 5/2013 | Aghdasi et al. | |
| 2013/0170557 A1* | 7/2013 | Wang | H04N 19/174 |
| | | | 375/240.24 |
| 2014/0063237 A1 | 3/2014 | Stone et al. | |
| 2014/0071273 A1* | 3/2014 | Balthasar | G07C 9/37 |
| | | | 348/143 |
| 2014/0089243 A1* | 3/2014 | Oppenheimer | H04L 67/12 |
| | | | 706/46 |
| 2014/0093848 A1 | 4/2014 | Ashbrook | |
| 2015/0288928 A1 | 10/2015 | Mccoy et al. | |
| 2016/0012655 A1* | 1/2016 | Hanson | H04W 4/029 |
| | | | 340/5.61 |
| 2016/0189510 A1 | 6/2016 | Hutz | |
| 2016/0196485 A1* | 7/2016 | Patterson | G06Q 30/016 |
| | | | 340/572.1 |
| 2017/0193279 A1 | 7/2017 | Kusens et al. | |
| 2017/0366498 A1 | 12/2017 | Green et al. | |
| 2018/0040217 A1 | 2/2018 | Feldman et al. | |
| 2018/0047230 A1* | 2/2018 | Nye | G07C 9/37 |
| 2018/0115797 A1* | 4/2018 | Wexler | H04N 21/41407 |
| 2018/0143637 A1 | 5/2018 | Tian et al. | |
| 2019/0034735 A1* | 1/2019 | Cuban | G06V 40/16 |
| 2019/0108734 A1* | 4/2019 | Cook | H04N 7/188 |
| 2019/0236370 A1 | 8/2019 | Man | |
| 2019/0340906 A1 | 11/2019 | Williams | |
| 2020/0014885 A1* | 1/2020 | Carey | H04N 7/181 |
| 2020/0193166 A1* | 6/2020 | Russo | G06V 20/52 |
| 2020/0311643 A1* | 10/2020 | Dalabiras | G06Q 10/06316 |
| 2020/0327335 A1 | 10/2020 | Khan et al. | |
| 2020/0327755 A1 | 10/2020 | Burris et al. | |
| 2021/0158677 A1 | 5/2021 | Kosta et al. | |
| 2021/0174094 A1* | 6/2021 | Oami | G06V 20/40 |
| 2021/0400469 A1* | 12/2021 | Seremet | G07C 9/28 |
| 2021/0404221 A1* | 12/2021 | Azam | G06F 21/31 |
| 2022/0020254 A1* | 1/2022 | Liu | G08B 13/189 |
| 2022/0198893 A1* | 6/2022 | Khan | H04W 4/029 |

OTHER PUBLICATIONS

"U.S. Appl. No. 16/696,706, Advisory Action mailed Nov. 8, 2021", 2 pgs.
"U.S. Appl. No. 16/696,706, Final Office Action mailed Sep. 3, 2021", 24 pgs.
"U.S. Appl. No. 16/696,706, Final Office Action mailed Oct. 30, 2020", 22 pgs.
"U.S. Appl. No. 16/696,706, Non Final Office Action mailed Apr. 9, 2021", 23 pgs.
"U.S. Appl. No. 16/696,706, Non Final Office Action mailed Jun. 23, 2020", 18 pgs.
"U.S. Appl. No. 16/696,706, Notice of Allowance mailed Jan. 14, 2022", 8 pgs.
"U.S. Appl. No. 16/696,706, Response filed Jul. 7, 2021 to Non Final Office Action mailed Apr. 9, 2021", 11 pgs.
"U.S. Appl. No. 16/696,706, Response filed Sep. 23, 2020 to Non Final Office Action mailed Jun. 23, 2020", 11 pgs.
"U.S. Appl. No. 16/696,706, Response filed Nov. 1, 2021 to Final Office Action mailed Sep. 3, 2021", 12 pgs.
"U.S. Appl. No. 16/696,706, Response filed Dec. 23, 2020 to Final Office Action mailed Oct. 30, 2020", 11 pgs.
EP Search Report—Jul. 12, 2023.

* cited by examiner

ASSET TRACKING AND NOTIFICATION PROCESSING

CROSS-REFERENCE TO RELATED APPLICATION

This application is a continuation of U.S. patent application Ser. No. 16/696,706, filed Nov. 26, 2019, which application and publication is incorporated herein by reference in its entirety.

BACKGROUND

Many enterprises have procedures in place for tracking a variety of enterprise assets. Most procedures are based on staff actions that require entries into written logs or electronic logs. However, some enterprises, such as banks track assets, that are very small, such as keys, gift cards, cashier checks, medallion stamps, notary stamps, etc. These types of assets are believed to be incapable/infeasible of being tracked in real time. Consequently, banks have to rely on staff to properly follow procedures and properly record when these types of assets are handled. Staff can make mistakes and can forget to make proper notations in logs, or even make incorrect entries in logs. Thus, tracking and auditing these types of assets remains a significant challenge in the banking industry.

Another type of asset that banks and other institutions track, and control are confidential documents. Such documents are usually identified by some type of code or classification written on the face of the documents. Each classification has its own internal handling security procedures. When a confidential document is not handled according to its procedures, the bank or a customer may be exposed to substantial risks. If a confidential document is in an insecure area for only a short period of time, an unauthorized person may view the documents. Identity theft is a major concern for financial institutions and for their customers. Moreover, now watches have the capability of snapping photographs, such that when a confidential document is in an unsecure area, it only takes a few seconds for a nefarious individual to discretely snap a quick photograph of the document. Unfortunately, tracking and auditing the handling of these types of assets are almost exclusively driven by employee trust and manual processes associated with oversight.

SUMMARY

In various embodiments, methods and a system for asset tracking and notification processing are presented.

According to an embodiment, a method for asset tracking and notification processing is presented. A type of asset located in a predefined location is identified. A security policy is obtained for the type of asset. An asset associated with the type of asset is tracked and monitored in accordance with the security policy, and events that violate the security policy are logged in a security log.

DETAILED DESCRIPTION

Figure 1:
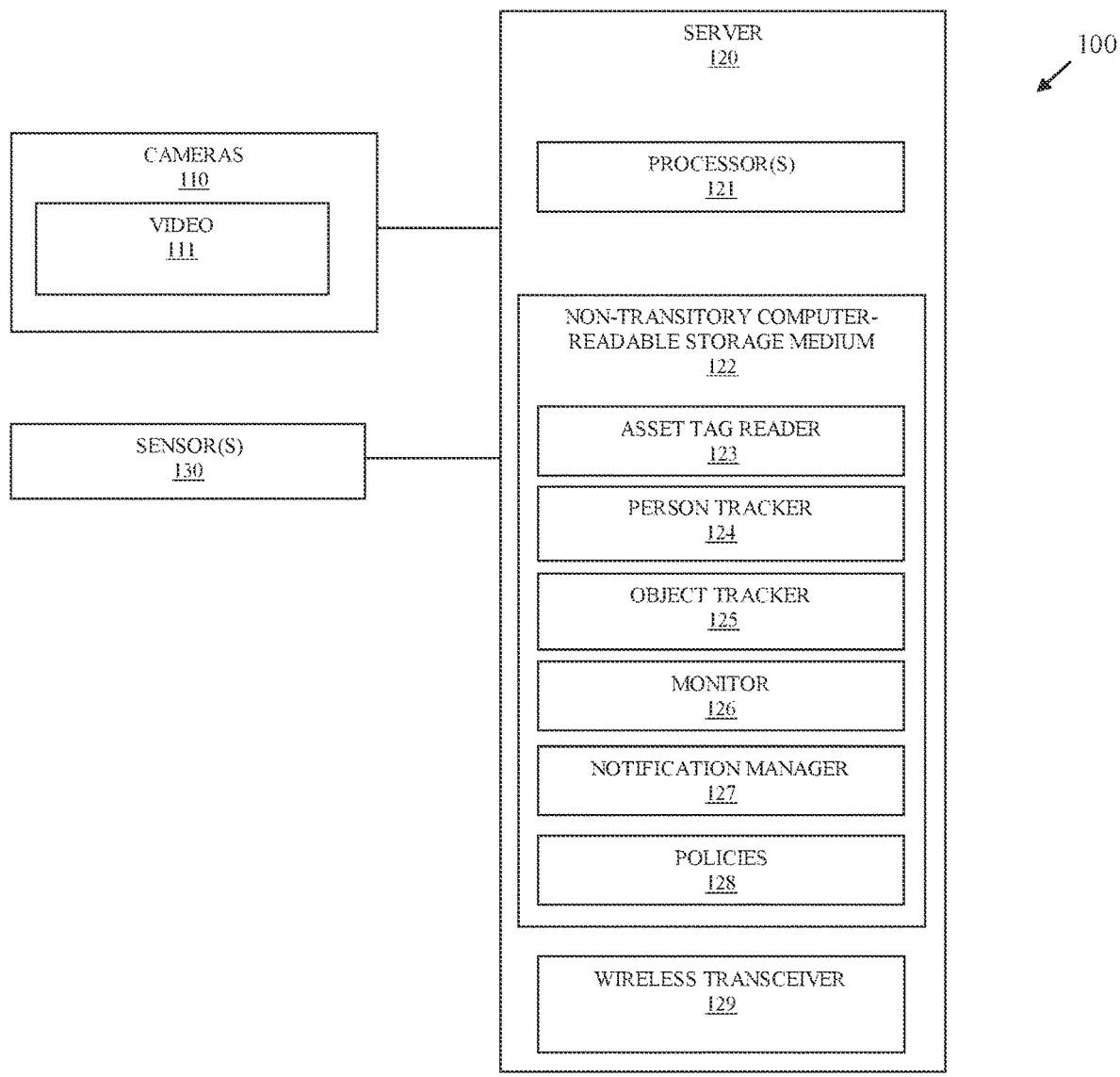
FIG. 1 is a diagram of a system for asset tracking and notification processing, according to an example embodiment.

FIG. 1 is a diagram of a system 100 for asset tracking and notification processing according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of asset tracking and notification processing, presented herein and below.

As used herein and below, the terms "user," "personnel," "actor," "person," "individual," and "subject" may be used interchangeably and synonymously. The terms refer to an individual detected within a predefined location where one or more secure assets are present.

The term "area" refers to a predefined location of an enterprise that is being monitored within images captured by cameras in real-time video. The entire location may be monitored through the images of the video frames as well as pre-designated objects (secure assets) within portions of the area. The location may require authentication to access or the location may not require authentication to access but includes assets that are being monitored for auditing, theft-avoidance, or any violation of predefined security policy.

Moreover, the predefined location may also be monitored through wireless signals and wireless tags that may be on the assets themselves. This can be achieved through a wireless mesh network, Internet protocol, custom protocols, Radio Frequency (RF) Identifiers (RFID), iButton®, BlueTooth®, Bluetooth® Low Energy (BLE), Light Detection and Ranging (LIDAR), combination sensors—using sensors such as acoustical (microphones) to measure sound pressure levels, accelerometers, and gyroscopes to detect movement in connection with a with a wireless solution to flag significant events.

Furthermore, the monitoring can be achieved through all or any combination of video tracking, wireless signal tracking, and/or sound tracking.

An "object" refers to a secure asset that is being monitored within the images of the video. An object may be any asset represented in the images and/or identified by wireless signals or sound comprising: a log book, a drawer, a desk, a safe, a Point-Of-Sale (POS) terminal, a Self-Service Terminal (SST), a door, a window, an Automated Teller Machine (ATM), a door or component of the ATM, a computer monitor, a piece of jewelry, a check, a piece of currency, a stamp device, cash, a key or set of keys, a safety deposit box, a gift card, documents, and/or anything of value or having confidential information, etc.

System 100 includes a plurality of cameras 110 that capture time-stamped video of persons and objects/assets in predefined areas (herein after just video 111"). System 100 also includes server 120, and one or more sensor(s) 130. Server 120 includes executable instructions that execute on one or more hardware processors 121 of server 120 from a non-transitory computer-readable storage medium 122 as: asset tag reader 123, person tracker 124, object tracker 125, monitor 126, notification manager 127. Non-transitory computer-readable-storage medium 122 also includes security policies 128. The server 100 also includes a wireless transceiver 129.

The security policies 128 includes statements of secure area identifiers, secure asset identifiers, and conditions that defines rules. Each rule identifying actions for a given secure area and/or secure asset that is permissible, that is required to be performed, and that is impermissible and should not be performed. Each rule may also include a resource identifier or an action that is to be processed when a given rule is violated. The resource associated with the resource identifier may be an automated application, a system, or an electronic contact address of an individual.

It is to be noted that there may be multiple servers 120, such that the different elements 123-127 may execute on a same server 120 or multiple different servers 120 networked together.

Cameras 110 are preconfigured to capture video 111 of the defined areas based on the field-of-view of the lenses of cameras 110. Some of cameras 110 may capture images 111 representing portions of a different area that a different one of the cameras 110 captures video 111 for. That is, each video 111 can include frames that may overlap multiple ones of the defined areas.

Initially, cameras 110 are situated in locations throughout an enterprise (such as a bank but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that camera 110 is situated within the enterprise), and one or more area identifiers (representing the predefined areas that the lens of camera 110 captures in the video 111).

Asset tag reader 123 receives wireless signals from wireless transceiver 129 emanating from an asset tag and identifies an asset by assigning an asset identifier.

Monitor 126 determines an asset type associated with a given asset, individuals present in a predefined location with the asset, relationships between any individuals within the predefined location and the asset, and other relationships between the asset and one or more other assets within the predefined location. In an embodiment, monitor 126 may also determine an amount of usage of a given asset within the predefined location.

Monitor 126 identifies an asset type within a predefined location based on a wireless tag read that is on the asset and that is read by asset tag reader 123 based on a wireless identifier associated with the asset being provided by wireless transceiver 129. Monitor 126 may also or monitor 126 may alternatively identify the asset type within the predefined location based on output provided by object tracker 125.

Object tracker 125 utilizes video 111 captured by a camera 110 associated with a predefined camera identifier and assigned to the predefined location and returns to monitor 126 on asset type, optionally a unique asset identifier, and a locations or position of the tracked asset within the predefined location. Person tracker 124 identifies individuals within the predefined location as unique identities of the individuals or unique but unknown identifiers associated with an individual. Person tracker 124 also provides the locations of each individual within the predefined location as well as poses, gazes, and actions of the individuals within the predefined location to monitor 126.

Person tracker 124 and object tracker 125 may use bounding boxes defined around pixels in video frames provided in the video 111 along with known fixed background pixel images associated with the predefined location and templates for individuals and assets/objects to identify and track positions of the individuals and assets within the predefined area. Person tracker 124 and object tracker 125 may also uses determined positions of individuals and assets within the predefined location to calculate distances between individuals relative to one another, distances between assets relative to one another, and distances between a given asset and a given individual.

The positions of the assets and the individuals (one or more) within the predefined location and the distances (as discussed above) as wells as poses, gazes, and actions of individuals within the predefined location are used by the monitor 126 to determine the relationships.

A relationship can be any of: an individual touching an asset or holding an asset (based on the distances between the individual and the asset being below a threshold or at 0), distances between two individuals from one another and an asset, distance between a single individual and an asset, distances between two or more assets, given type of asset determined to be in the predefined location with no detectable individual within the predefined location, a pose or gaze of an individual relative to another individual, and/or a pose or gaze of an individual relative to an asset.

The monitor 126 identifies the asset type based on the asset tag reader 123 and/or the object tracker 125 provided inputs. The asset type is used to obtain a linked security policy 128 associated with that asset type. The security policy 128 defines conditions for relationships based on relationship identifiers, asset identifiers or asset type identifiers, individual identifiers, and predefined location identifiers. The conditions are expressed in statements representing rules for the identifiers and processing actions that are to be taken when the conditions of the rule are satisfied. Monitor 126 receives the identifiers for the asset and individuals along with the distances and positions of the assets and individuals and any poses and gazes of the individuals and the monitor 126 determines based on the distances and positions of the individuals (or no individuals) and the asset (or assets) along with any poses, gazes, and actions specific relationship identifiers. The relationship identifiers, individual identifiers (if any), and asset identifier or identifiers are plugged into the rules of the security policy 128 obtained for the asset type of the asset and the conditions of the rules are evaluated. Any condition that evaluated to true has the corresponding processing actions associated with that condition for the rule processed by monitor 126.

When a processing action requires a notification or an alert, the resource identifier is passed to notification manager 127. Notification manager then sends an appropriate message regarding the rule that was violated to a resource defined by the resource identifier. The receiving resource may be a security system, an automated application, or an electronic address for a human resource associated with a given messaging system (text, email, social media, mobile application, etc.).

When the processing action associated with a rule of the security policy 128 that was violated either monitor 126 or notification manager 127 may record an entry regarding the violation in a security audit log.

It is to be noted that some processing actions of some rules of the security policy 128 may require that either monitor 126 or notification manager 127 make entries in the security audit log associated with the asset. That is, even authorized access and use of the asset is noted and recorded in the security audit log. This allows for compliance with internal enterprise security policies and compliance with any government regulations associated with the asset.

In addition, some of the policies 128 may include a tracking or usage policy with respect to the asset. Monitor 126 may use time stamps of the video frames along with the distances (as discussed above) to record a usage of the asset by an individual based on the asset being in known possession of an individual and recording an amount of time that the individual possessed the asset within the predefined location. This amount of time may be used as a usage time to record an amount of usage that the individual used the asset. The usage time may be (based on processing actions defined in the tracking or usage policy) written to a different tracking or usage log or written with appropriate identifiers in the security audit log.

The usage time may be aggregated from the appropriate log based on custom-defined time frames for the enterprise or establishment to determine a total usage of the asset within a given time frame. This information may allow an establishment to determine whether or not the asset should be removed and placed somewhere else other than the predefined location where it will experience more usage and be of better value to the establishment or determine whether an additional asset of the same asset type should be added to the predefined location based on excess use or need of that asset.

Each camera 110 provides time stamp and image-frame stamped video 111 to server 120. This video 111 can be streamed over a wired or wireless connection between cameras 110 and server 120 to a commonly accessible storage area on server 120 that is accessible to person tracker 124, object tracker 123, action tracker 126, and audit-notification manager 127.

Each accessible video frame includes its metadata (minimally including what was discussed above) with its video frame on the server 120.

Asset tag reader 123, person tracker 124, and object tracker 125 are configured to listen or look for changes in the predefined location. In the case of the asset tag reader 123 when a new tag for a new asset is detected as being read and event is raised which is detected by monitor 126 and the above-noted processing is performed. In the case of the person tracker 124 and object tracker 125 video 111 is continuously being streamed by camera 110 to server 120 looking for changes to a standard background image of the predefined location with known assets/objects, when a change is detected such as a new asset/object or a person present in the predefined location and event is raised which is detected by monitor 126 and the above-noted processing is performed.

In an embodiment, object tracker 125 is configured to detect special visual attributes/features associated with some objects/assets, such as documents, checks, cash, cash boxes, etc. The visual features may be a watermark that is invisible to the human eye or may be visible to the human eye having a distinctive color or marking. The visual features may permit object tracker 125 to assign a unique identity or identifier to the asset. In this way, assets of a same type may be uniquely distinguished and identified. For example, cash boxes or keys in a predefined location may include a color marking that uniquely identifies each asset from other assets of the same type. A confidential document may be identified via a watermark invisible to the human eye. Other situations are possible as well.

In an embodiment, a trained machine-learning algorithm is used along with the unique visual features discussed above to perform the asset identification and object tracking.

In an embodiment, trained machine-learning algorithms may be used for all or of some portion of person tracker 124 and/or object tracker 125.

In an embodiment, monitor 126 uses wireless signals transmitted from wireless tags on assets within the predefined location to determine the distances between the assets within the predefined location. Wireless signals are received by transceiver 129 having signal strengths. The signal strengths received for each asset is noted for a known and authorized configuration of the assets within the predefined location, when changes are detected, monitor 126 knows that the authorized distances between those assets has changed. A distance of each asset may be determined relative to the transceiver 129, such that the distances between the assets can be derived. These distances may then be evaluated as relationships within the appropriate security policy 128 as discussed above.

One now appreciates how system 100 can be used as a real-time asset tracking and notification system that can augment or replace traditional procedures of secure areas and secure assets. Moreover, in many cases the above-noted tracking has been incapable of being performed in the industry. Both compliant asset situations and non-compliant asset situations can be custom logged for auditing and real-time notifications can be raised. The system 100 allows real-time tracking of asset types that has previously been incapable of being achieved within the industry. Furthermore, personnel/individuals are not required to make manual written entries into security logs as this is achieved with accuracy and without error by system 100; although the written entries may still be required and used as a cross check with system 100.

A variety of scenarios are possible with system 100 some of which but not all of which are now discussed.

Person tracker 124 may be equipped with biometric recognition, such that facial features, eyes, body structure, gait, extremity distances, etc. of the individuals being tracked can be derived from the pixels of the video frames and matched to a registered individual or the enterprise. An enterprise identifier for the individual may then be recorded within the security log with the security log entries. The enterprise identifier for the individual may also be assigned to a role and the role identifier may also be embedded in the conditions of the rules for the security policies 128 for evaluation by monitor 126.

Person tracker may use biometric recognition to identify an individual uniquely from other individuals and calculate a biometric value from the facial features of the individual. The biometric value may be assigned to a randomly generated identifier and linked to the biometric value. The randomly generated identifier is used by person tracker 124 and written with the security log entries by monitor 126 in the security log.

Sensors 130 can include a microphone where voice of sound may be reported within the predefined location. The voice may be translated into a unique voice print registered to a known individual of the enterprise associated with a role and an individual identifier. This may be used to identify individuals within the predefined location. Sound may be used to determine when an activity is taking place within the predefined location, Additional voice conversations within the predefined location may be translated to text and recorded or evaluated based on content identifiers, which may be embedded in the conditions of the rules for the security policies 128.

Other sensors 130 may be used as well for temperature, humidity, motion, door, window, door of panel on ATM, etc. Monitor 126 may used expected readings against recorded readings when there is activity being tracked and monitored within the predefined location. The expected readings or thresholds of the expected readings may also be embedded in the conditions of the rules for the security policies.

Notification manager 127 may embed a reference link to the video clip within the security entries made to the security log for accessing the video clip from the security log.

Some policies 128 can define behaviors or actions taken by a person or asset (object) being tracked, such as holding a key (one object), putting an object in a pocket or bag, leaving with an object, grasping a door handle (another object), sitting in front of a secure monitor, stationary within the secure area for a minimum period of elapsed time, holding something of value, multiple persons in a given secure area, looking in a direction of a specific camera 110, placing a hand on a specific access device/sensor 130, putting an object over or covering a camera 110, etc.

In an embodiment, the predefined location is associated with a Bank and the objects are secure assets or structures within the secure locations.

In an embodiment, the predefined locations are associated within any retail or governmental site and the objects are structures or secure assets being tracked.

In an embodiment, notification manager 127 includes a reporting interface for automatically or custom generating reports for predefined area, secure assets, policy violations, specific individuals, etc.

The above-noted embodiments and other embodiments are now discussed with reference to FIGS. 2-4.

Figure 2:
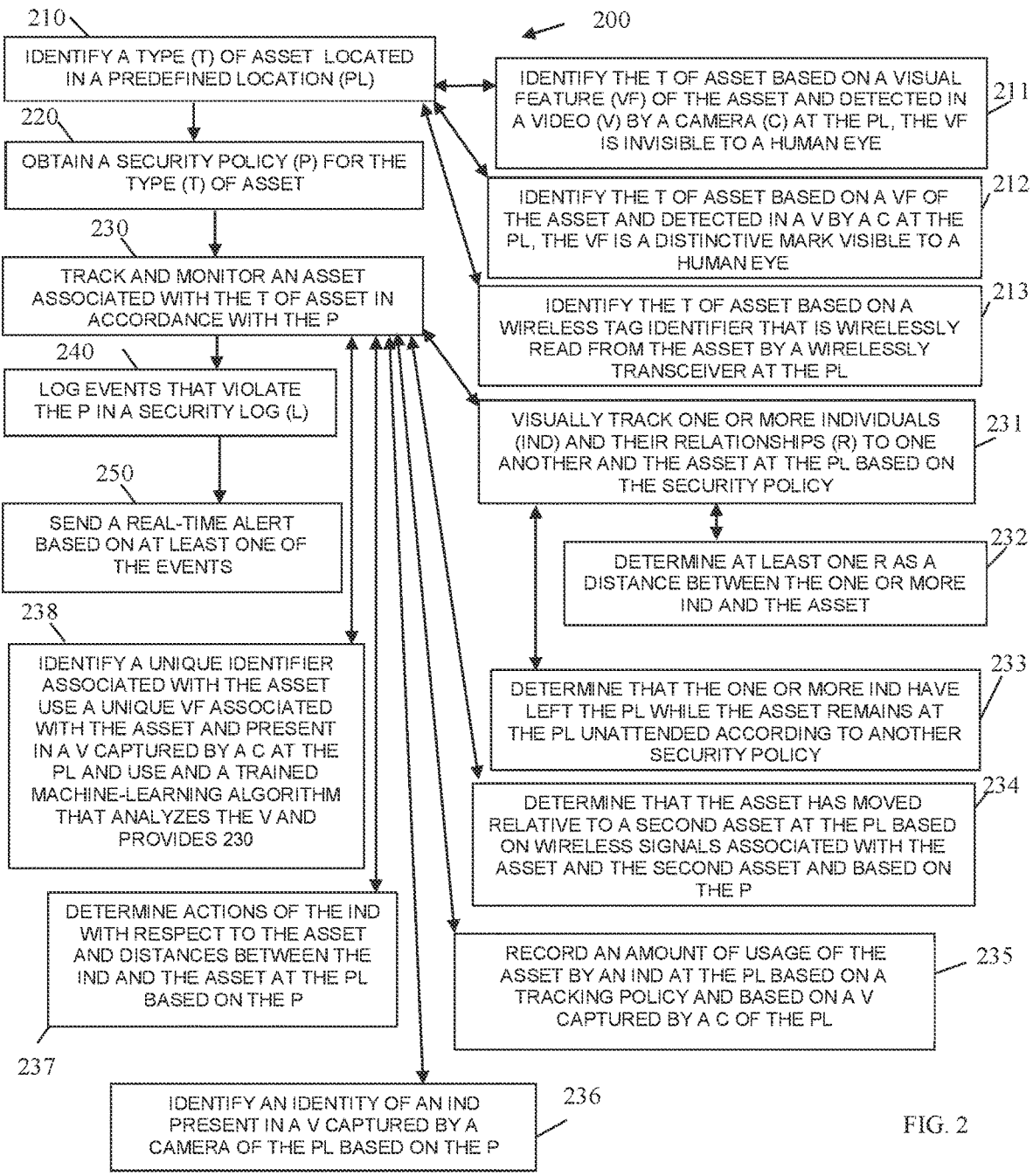
FIG. 2 is a diagram of a method for asset tracking and notification processing, according to an example embodiment.

FIG. 2 is a diagram of a method 200 for asset tracking and notification processing, according to an example embodiment. The software module(s) that implements the method 200 is referred to as a "security monitor." The security monitor is implemented as executable instructions programmed and residing within memory and/or a non-transitory computer-readable (processor-readable) storage medium and executed by one or more processors of a device. The processor(s) of the device that executes the security monitor are specifically configured and programmed to process the security monitor. The security monitor may have access to one or more network connections during its processing. The network connections can be wired, wireless, or a combination of wired and wireless.

In an embodiment, the device that executes the security monitor is server 120. In an embodiment, server 120 is a cloud-based server, a local-area network (LAN)-based server, or a wide-area network (WAN) server.

In an embodiment, the security monitor is all or some combination of: the asset tag reader 123, person tracker 124, object tracker 125, monitor 126, monitor 127, and/or notification manager 127.

At 210, the security monitor identifies a type of asset located in a predefined location of an establishment.

In an embodiment, at 211, the security monitor identifies the type of asset based on a visual feature of the asset and detected in a video by a camera at the predefined location. The visual feature is invisible to the human eye, such as a watermark.

In an embodiment, at 212, the security monitor identifies the type of asset based on a visual feature of the asset and detected in a video by a camera at the predefined location. The visual feature is visible to the human eye, such as a unique color or unique mark.

In an embodiment, at 213, the security monitor identifies the type of asset based on a wireless tag identifier that was wireless read from the asset by a wireless transceiver at the predefined location.

At 220, the security monitor obtains a security policy for the type of asset. The security policy is the security policy 128 discussed above with the FIG. 1.

At 230, the security monitor tracks and monitors an asset associated with the type of asset in accordance with the security policy.

In an embodiment, at 231, the security monitor visually tracks one or more individuals and their relationships to one another and the asset at the predefined location based on the security policy.

In an embodiment of 231 and at 232, the security monitor determines at least one relationship as a distance between the one or more individuals and the asset within the predefined location.

In an embodiment of 231 and at 233, the security monitor determines that one or more of the individuals have let the predefined location while the asset remains at the predefined location unattended according to another security policy.

In an embodiment, at 234, the security monitor determines that the asset has moved relative to a second asset at the predefined location based on wireless signals and wireless signal strengths associated with the asset and the second asset and based on the security policy.

In an embodiment, at 235, the security monitor records an amount of usage of the asset by an individual at the predefined location based on a tracking policy and based on a video captured by a camera of the predefined location. This can be done by recording an amount of time that the individual possesses or is holding the asset as was discussed above with the FIG. 1.

In an embodiment, at 236, the security monitor identifies an identity of the individual present in a video captured by a camera of the predefined location based on the security policy. This may include any number of biometric-based features extracted from the video for the individual and/or extracted from other sensors (such as a microphone, fingerprint reader, retina scan, etc.).

In an embodiment, at 237, the security monitor determines actions of the individual with respect to the asset and distances between the individual and the asset at the predefined location based on the security policy. The actions may include a gaze or stare of the individual at the asset or not at the asset, holding the asset, not holding the asset, and others.

In an embodiment, at 238, the security monitor identifies a unique identifier associated with the asset and uses a unique visual feature associated with the asset and present in a video captured by a camera at the predefined location and uses a trained machine-learning algorithm that analyzes the video and provided the tracking and monitoring of the asset as output from the trained machine-learning algorithm.

Figure 3:
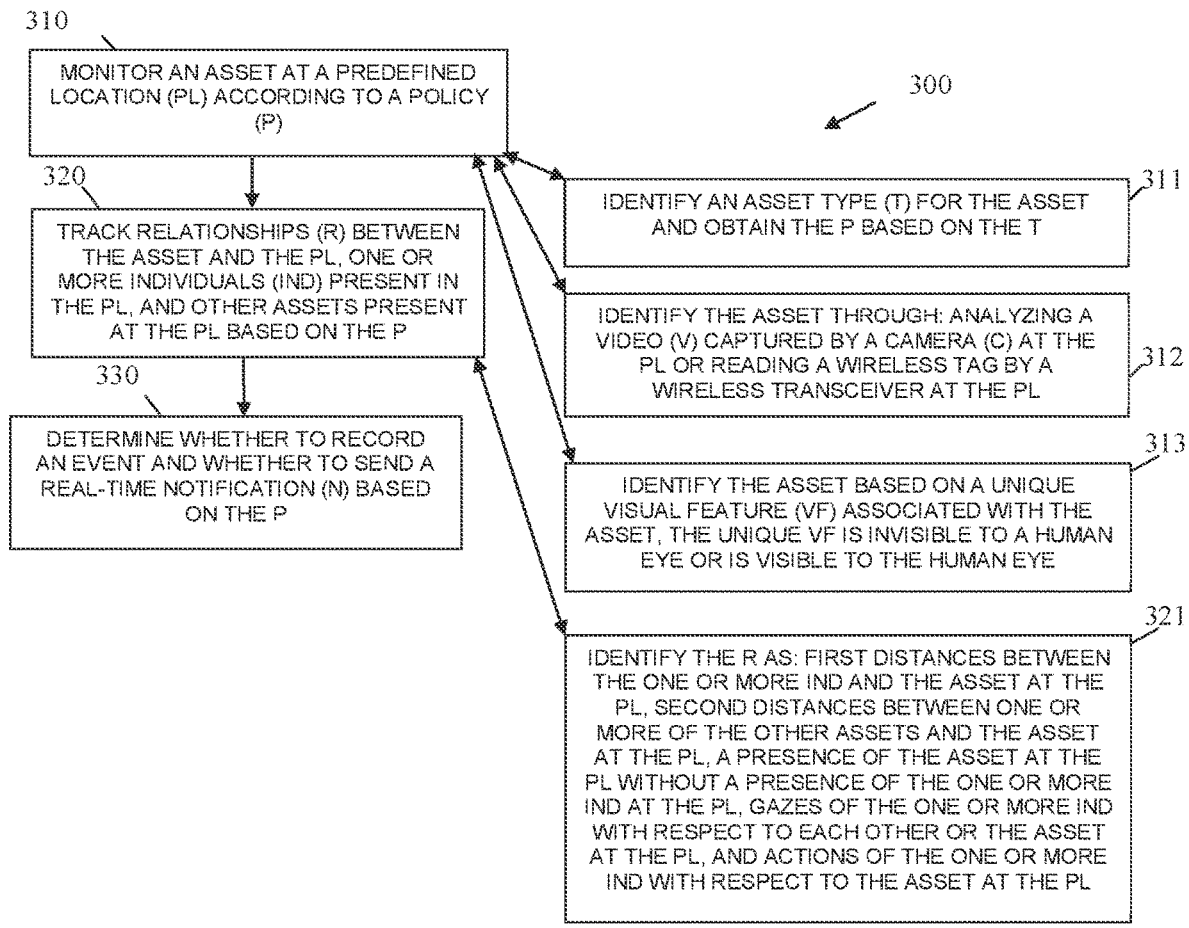
FIG. 3 is a diagram of another method for asset tracking and notification processing, according to an example embodiment.

FIG. 3 is a diagram of another method 300 for asset tracking and notification processing, according to an example embodiment. The software module(s) that implements the method 300 is referred to as an "secure asset monitor." The secure asset monitor is implemented as executable instructions programmed and residing within memory and/or a non-transitory computer-readable (processor-readable) storage medium and executed by one or more processors of a device. The processors that execute the secure asset monitor are specifically configured and programmed to process the secure area monitor. The secure asset monitor may have access to one or more network connections during its processing. The network connections can be wired, wireless, or a combination of wired and wireless.

In an embodiment, the device that executes the secure asset monitor is the server 120. In an embodiment, the server 120 is a cloud processing environment, a LAN server, or a WAN server.

In an embodiment, the secure asset monitor is all of or some combination of: asset tag reader 123, person tracker 124, object tracker 125, monitor 126, notification manager 127, and/or the method 300.

The secure asset monitor presents another and, in some ways, enhanced processing perspective of the method 200 discussed above.

At 310, the secure asset monitor monitors an asset at a predefined location according to a policy.

In an embodiment, at 311, the secure asset monitor identifies the asset type for the asset and obtains the policy based on the type for the asset.

In an embodiment, at 312, the secure asset monitor identifies the asset through: analyzing a video captured by a camera at the predefined location or reading a wireless tag attached to the asset, which is read by a wireless transceiver at the predefined location.

At 320, the secure asset monitor tracks relationships between the asset and the predefined location, one or more individuals present in the predefined location, and other assets present at the predefined location based on the policy.

In an embodiment, at 321, the secure asset monitor identifies the relationships as: 1) first distances between the one or more individuals and the asset at the predefined location; 2) second distances between the one or more of the other assets and the asset at the predefined location; 3) a presence of the asset at the predefined location without a presence of the one or more individuals at the predefined location; 4) gazes of the one or more individuals with respect to each other or the asset at the predefined location; and 4) actions of the one or more individuals with respect to the asset at the predefined location.

At 330, the secure asset monitor determines whether to record an event and whether to send a real-time notification based on the policy.

Figure 4:
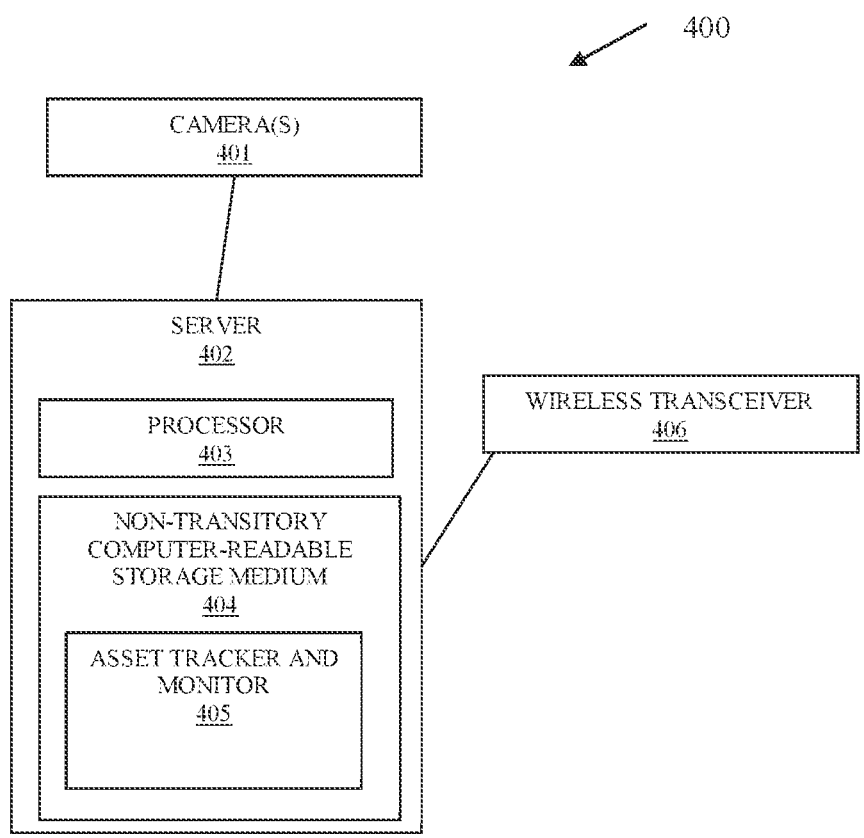
FIG. 4 is a diagram of another system for asset tracking and notification processing, according to an example embodiment.

FIG. 4 is a diagram of a system 400 for asset tracking and notification processing; according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter aha, the processing described above with the FIGS. 1-3.

The system 400 includes one or more cameras 401; a server 402, and, optionally, a wireless transceiver 406. The server 402 includes at least one hardware processor 403, a non-transitory computer-readable storage medium 404 having executable instructions representing a security asset tracker and monitor 405.

The camera 401 is configured to capture video of a predefined location of an establishment/enterprise.

The security asset tracker and monitor 405 when executed from the non-transitory computer-readable storage medium 404 on the processor 403 is configured to cause the processor 403 to perform processing comprising: 1) obtaining the video from the camera 401; 2) analyzing the video and identifying an asset; 3) analyzing the video and identifying one or more individuals present within the video; 4) determining from the video relationships between the asset and the predefined location and the one or more individuals; and 5) recording security events and sending real-time notifications based on the relationships and a policy assigned to an asset type associated with the asset.

In an embodiment, the system 400 further includes transceiver 406. The security monitor 405 when executed from the non-transitory computer-readable storage medium 404 on the processor 403 is configured to cause the processor 403 to perform additional processing comprising: 1) determining distance between the asset and one or more second assets at the predefined location based on wireless signals emitted from tags on the asset and the one or more second assets and read by the wireless transceiver; and 2) recording second security events and sending second real-time notifications based on the distance and the policy.

In an embodiment, the security manager is all of or some combination of: detector 123, person tracker 124, object tracker 125, action tracker 126, audit-notification manager 127, the method 200, and/or the method 300.

It should be appreciated that where software is described in a particular form (such as a component or module) this is merely to aid understanding and is not intended to limit how software that implements those functions may be architected or structured. For example; modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining a security policy and rules for an asset type of an asset selected from a plurality of asset types and a plurality of available assets, wherein the asset is located in a predefined location based at least on a video captured for the predefined location;
    tracking and monitoring the asset within the predefined location in accordance with the security policy and the rules using sensor data from sensors situated in the predefined location and the video captured for the predefined location, wherein the tracking and monitoring include using a machine learning algorithm specifically trained to recognize the asset type based on unique visual features associated with the asset type that are not visible to a human eye; and maintaining an audit log comprising events raised during the tracking and the monitoring for the asset and the predefined location;

wherein the events are logged in real time and include timestamps correlating to video frames captured;

wherein the audit log includes metadata indicating which specific policies were triggered and which specific actions were taken in response to the events;

wherein the tracking and monitoring further includes determining actions of individuals with respect to the asset and distances between the individuals and the asset at the predefined location based on the security policy.

2. The method of claim 1 further comprising, sending a real-time alert based on a specific event raised during the tracking and the monitoring.

3. The method of claim 1, wherein tracking and monitoring further includes identifying the asset within the predefined location based on a tag that is identifiable from the video.

4. The method of claim 1, wherein tracking and monitoring further includes identifying the asset within the predefined location based on a wireless signal emitted from a wireless tag that is adjacent to or on the asset.

5. The method of claim 1, wherein tracking and monitoring further includes evaluating spoken words of individuals present within the predefined location from audio data captured by a microphone sensor within the predefined location.

6. The method of claim 1 further comprising maintaining links to video clips of the video within the audit log, each link corresponding to a specific event raised and a corresponding video clip that matches a corresponding specific event within the video.

7. The method of claim 1, wherein tracking and monitoring further includes tracking and monitoring one or more individuals present within the predefined location from the sensor data and the video by identifying relationships of the one or more individuals relative to the asset using the security policy and the rules.

8. The method of claim 7, wherein identifying the relationships further includes calculating distances between each of the one or more individuals and the asset and mapping the distances to the relationships.

9. The method of claim 1, wherein tracking and monitoring further includes processing the machine learning algorithm to track the asset within the predefined location and to track other objects present within the predefined location from the video.

10. The method of claim 1, wherein tracking and monitoring further includes using a background image associated with background objects within the predefined location to detect movement of the background objects within the predefined location and to detect new objects present within the predefined location based on changes in the video frames of the video that do not match the background image.

11. The method of claim 1, wherein tracking and monitoring further includes uniquely identifying an individual present within the predefined location based on biometric data obtained from the sensor data of the sensors or based on visual features of the individual that are derived from the video.

12. A method, comprising:

maintaining a plurality of security policies and monitoring rules for assets known to be located in a secure area based on asset types for the assets and a secure area identifier for the secure area;

obtaining real-time sensor data from sensors and real-time video from cameras situated in the secure area;

monitoring the real-time sensor data and the real-time video for events detected within the secure area, wherein the monitoring includes applying a machine learning algorithm specifically trained to recognize the asset types based on unique visual features associated with the asset types that are not visible to a human eye, and wherein the monitoring further includes generating real-time alerts for detected events;

evaluating a given security policy based on given events using certain monitoring rules; and recording the given events in a log as an audit associated with corresponding assets of the secure area;

wherein log entries for the log include detailed descriptions of the given events and specific security policies violated;

wherein the log entries for the log include an amount of usage for a given asset by an individual at the secure area based on a tracking policy and based on the real-time video captured by the cameras;

wherein the monitoring further includes determining that one or more individuals have left the secure area while an asset remains at the secure area unattended according to another security policy.

13. The method of claim 12 further comprising, providing a link for each of the given events within the log to corresponding sensor data and a corresponding video clip from the real-time video that was present when a corresponding given events were detected during the monitoring.

14. The method of claim 12, wherein monitoring further includes sending a message to a predefined resource defined in the certain monitoring rules for a specific event that violated a specific rule of the certain monitoring rules.

15. The method of claim 14, wherein sending the message further includes identifying the predefined resource as a security system, an automated application, or an address that is to be sent the message via a given messaging system.

16. The method of claim 12, wherein monitoring further includes evaluating at least one certain monitoring rule as an amount of time an individual detected in the real-time sensor data and the real-time video possessed, interacted with, or handled a given one of the corresponding assets and maintaining the amount of time with a corresponding given event.

17. The method of claim 12, wherein monitoring further includes receiving a portion of the real-time sensor data as audio captured by a microphone sensor within the secure area and spoken by an individual detected in the secure area during the monitoring and maintaining text for corresponding speech with a corresponding given event.

18. The method of claim 17, wherein receiving the portion further includes translating the audio into a unique voice print that is matched to a known individual who is the individual and linking a security role and a known user identifier for the individual to a portion of the given security policy.

19. A system, comprising:
a camera to capture video of a secure area;
a microphone to capture audio within the secure area;
a server comprising a processor and a non-transitory computer-readable storage medium;

the non-transitory computer-readable storage medium comprising executable instructions;

the executable instructions executed on the processor causing the processor to perform operations comprising:

obtaining a security policy and monitoring rules for an asset known to be located within the secure area by at least identifying the asset in video of the secure area and selecting the security policy from a plurality of available security policies based on an asset type assigned to the asset;

tracking and monitoring activities within the secure area with respect to the asset by evaluating the security policy and the monitoring rules using the video streamed in real time from the camera and using on the audio streamed in real time from the microphone, wherein the tracking and monitoring are enhanced by a machine learning algorithm specifically trained to recognize and track the asset type based on unique visual features associated with the asset type, wherein monitoring includes generating real time alerts for detected events; and recording events detected during the tracking and the monitoring in an audit log;

wherein log entries for the audit log include timestamps and detailed descriptions of the events and specific security policies violated;

wherein the audit log further includes metadata indicating which specific policies were triggered and which specific actions were taken in response to the events detected;

wherein the tracking and monitoring further includes determining that the asset has moved relative to a second asset at the secure area based on wireless signals and wireless signal strengths associated with the asset and the second asset and based on the security policy.

20. The system of claim 19, wherein the executable instructions executed on the processor from the non-transitory computer-readable storage medium further causing the processor to perform additional operations comprising:

sending a real-time notification to a security system when a particular event was detected during evaluation of the security policy for a particular one of the activities.

* * * * *